W. R. GARNER.
ENGINE DRIVE WHEEL.
APPLICATION FILED AUG. 27, 1918.
1,313,178.
Patented Aug. 12, 1919.
3 SHEETS—SHEET 1.
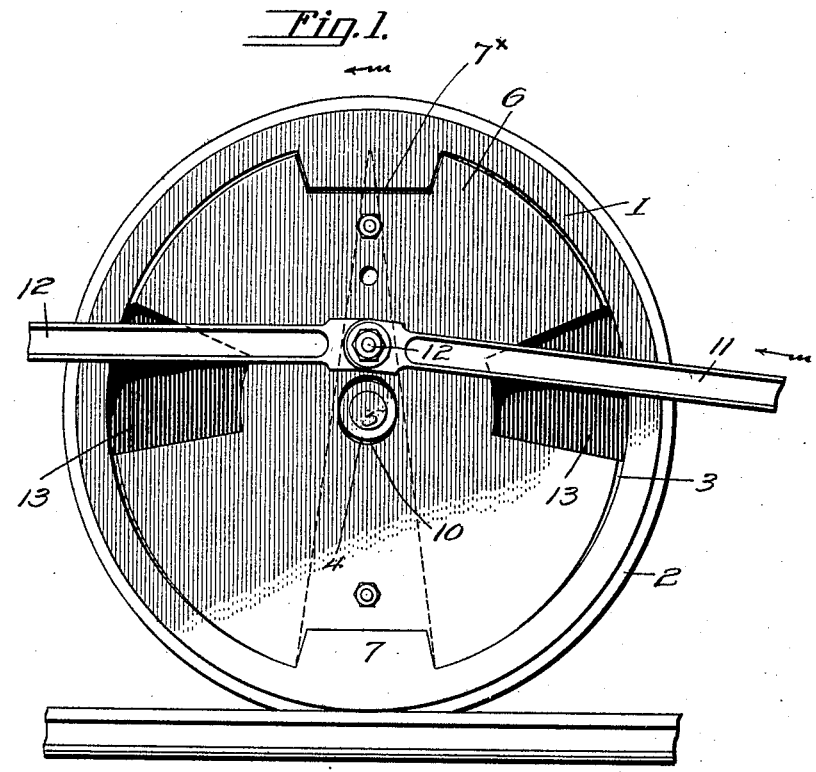
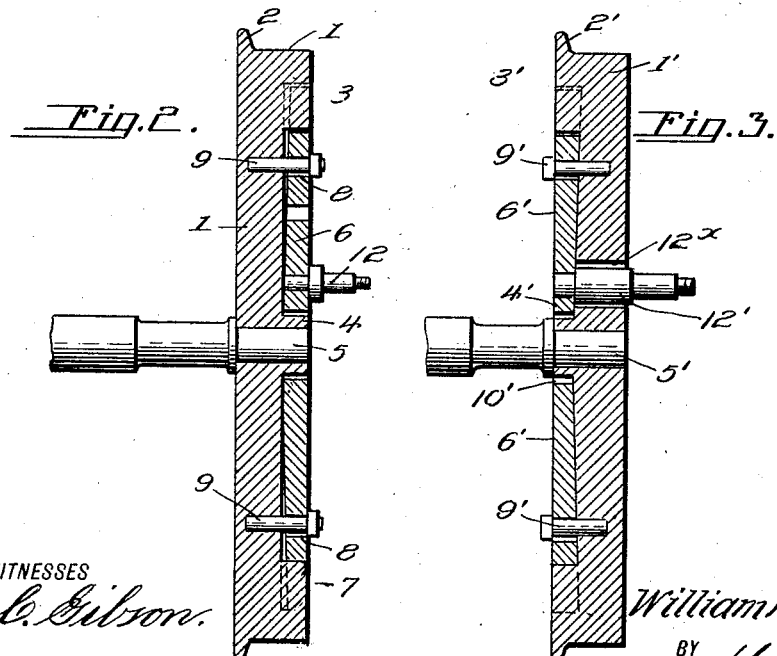
WITNESSES
F. C. Gibson
INVENTOR
William R. Garner
BY
ATTORNEYS

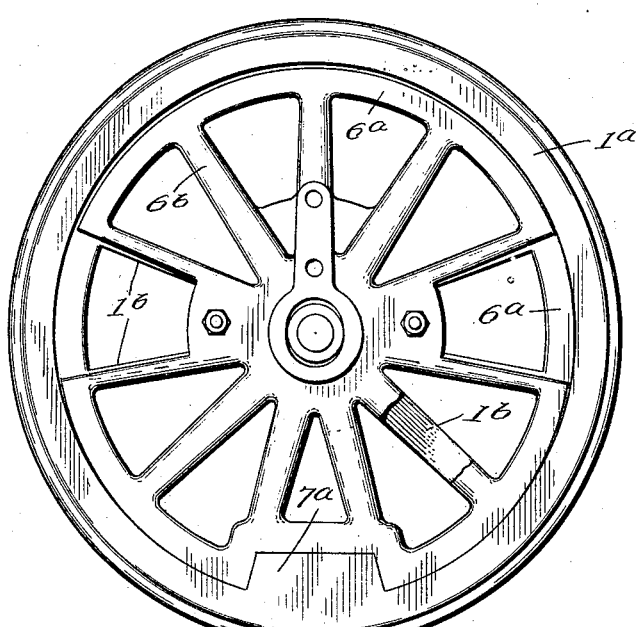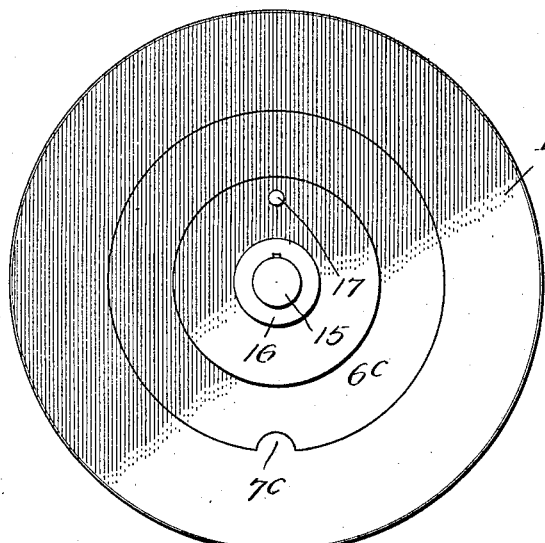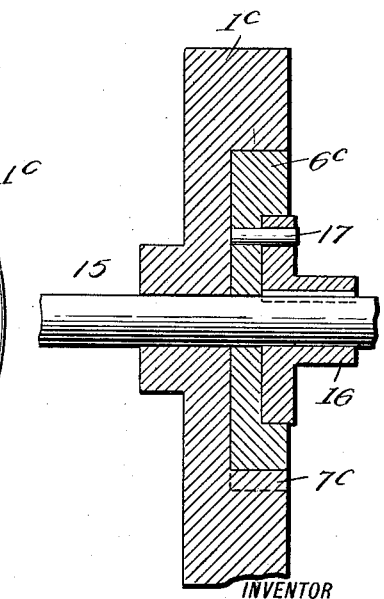

W. R. GARNER.
ENGINE DRIVE WHEEL.
APPLICATION FILED AUG. 27, 1918.

1,313,178.

Patented Aug. 12, 1919.
3 SHEETS—SHEET 3.

WITNESSES
F. C. Gibson.

INVENTOR
William R. Garner.
BY
Munn & Co.
ATTORNEYS

UNITED STATES PATENT OFFICE.

WILLIAM R. GARNER, OF ERIE, PENNSYLVANIA.

ENGINE DRIVE-WHEEL.

1,313,178.  Specification of Letters Patent.  Patented Aug. 12, 1919.

Application filed August 27, 1918. Serial No. 251,675.

*To all whom it may concern:*

Be it known that I, WILLIAM R. GARNER, a citizen of the United States, and a resident of Erie, in the county of Erie and State of Pennsylvania, have invented certain new and useful Improvements in Engine Drive-Wheels, of which the following is a specification.

My invention is an improvement in drive wheels for engines, and it consists in the combination, constructions and arrangements herein described and claimed.

An object of my invention is to provide an arrangement by means of which the driving force communicated to the drive wheel of an engine by means of the pitman is equalized around the wheel in such a manner that unsteadiness of the driving motion of the wheel is eliminated.

A further object of my invention is to provide a drive wheel in which the driving force is applied to the wheel proper on the opposite side of the axle from that to which the pitman is connected, the axle acting as a fulcrum.

A further object of my invention is to provide a device of the character described, consisting of a main body portion and an auxiliary disk having a bearing on the central portion of the main wheel and being connected with the main wheel near the periphery thereof so as to transmit the force from the pitman to the main body portion.

Other objects and advantages will appear in the following specification and the novel features of the invention will be particularly pointed out in the appended claims.

Figure 7:
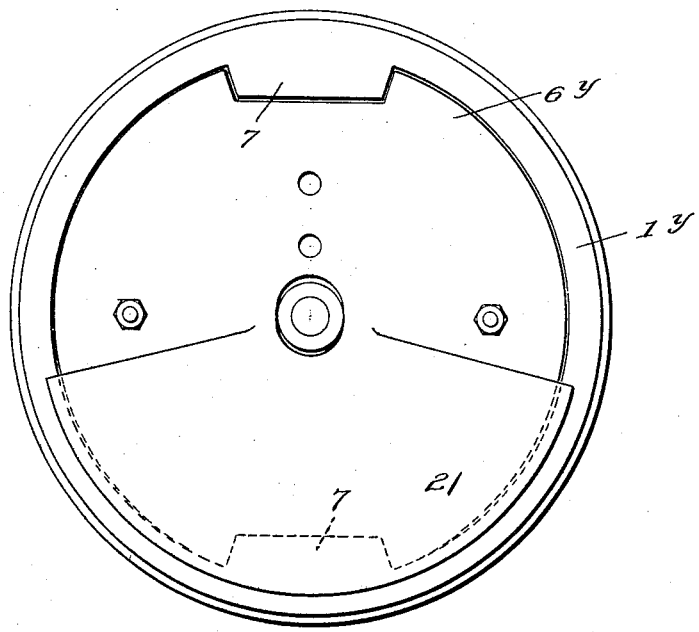

My invention is illustrated in the accompanying drawings forming a part of this specification and in which Figure 1 is a side view of a wheel constructed in accordance with my invention, Fig. 2 is a central sectional view of the wheel shown in Fig. 1, Fig. 3 is a view of a modified form of the device, Fig. 4 is a face view of another modified form of the device, Fig. 5 is a face view of another modified form applicable to an internal combustion engine, Fig. 6 is a sectional view of the wheel shown in Fig. 5, Fig. 7 is a face view of a modified form of the device, and

Figure 8:
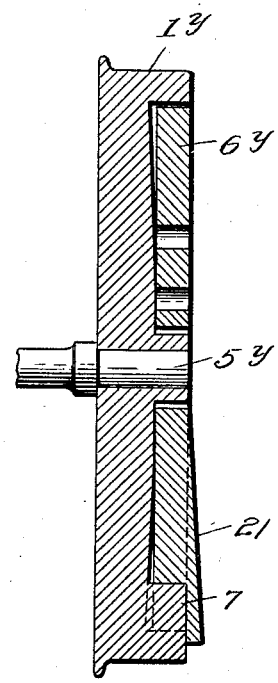

Fig. 8 is a sectional view of the form shown in Fig. 7.

In carrying out my invention, I provide a main body portion 1 having a rail flange 2. The body portion is recessed on one side thereof as shown at 3 in Fig. 2. A central hub portion 4 is provided, this hub being bored to receive the axle 5.

An auxiliary disk 6 is provided which fits in the recess 3. This disk as will be observed from Fig. 2 is beveled from the center outwardly so as to provide a bearing on the hub 4. In Fig. 1 it will be seen that I have provided lugs 7 and 7$^x$ which are integral with the wheel 1 and which project toward the center of the wheel.

The disk 6 is recessed to receive the lugs 7 and 7$^x$ as shown in Fig. 1. The disk is provided with openings 8 arranged to receive pins 9 which extend into the body portion 1. These openings 8 are larger than the pins to provide a slight play of the disk 6. The latter is designed to fit within the recess 3 but it has a very slight play in one direction.

As will be observed from Fig. 1 there is an elliptical shaped opening 10 in the disk arranged to receive the hub 4. The major axis of the opening 10 is in alinement with the openings 8 and with the center of the lugs 7 and 7$^x$.

In the drawings I have shown the disk 6 as being spaced slightly from the upper inner edge of the body portion 1, but this is for the purpose of illustration only, since as a matter of fact, the movement of the auxiliary disk 6 is very slight, say a few thousandths of an inch. It will be observed that there is no movement of the auxiliary disk at right angles, that is, along the minor axis of the elliptical shaped opening.

The pitman 11 is connected to the auxiliary disk by means of a pin 12 at a point in alinement with the major axis of the elliptical shaped opening 10, the connecting rod 12 also being secured to the pin.

The auxiliary disk 6 is provided with cutaway portions 13 so as to counter-balance the weight of the connecting rod, pitman and pin, in other words, to render the wheel as a whole with its connections, counter-balanced.

From the foregoing description of the various parts of the device, the operation will be readily understood. Assume that the wheel is turning in the direction indicated by the arrow in Fig. 1, the thrust of the pitman is in the direction of movement of the wheel in the position shown in Fig. 1. The disk 6 having settled very slightly is in close contact with the lug 7, and therefore the force communicated by the pitman 11 is transmitted to the body portion 1, the axle 5 acting as a fulcrum. The resistance at the rail causes the pitman to act as a lever to propel the wheel as a whole forwardly.

Consider the conditions now when the wheel has turned 180°. In this position the pitman is moving rearwardly and owing to the lever action the force is applied now at the top of the wheel on the opposite side of the axle. A wheel constructed according to this invention tends to equalize the pressure so that the motion of the wheel is more uniform than in the ordinary construction.

In Fig. 3, I have shown a modified form of the device in which the body portion 1' is recessed at 3' on a taper or bevel, this recess being deeper at the outside and gradually decreasing in depth to the hub 4'. The auxiliary plate 6' is of a uniform width so as to give a central bearing for the plate. It will also be observed that the recess 3' is on the inside of the wheel. In this form of the device, the connecting pin 12' passes through an opening 12$^x$ in the main body portion and is secured to the auxiliary plate 6'. The action of this form of the device is the same as that shown in Fig. 2, the driving force being distributed in a more efficient manner than in the ordinary drive wheel for the reasons stated.

In Fig. 4 I have shown the body portion 1$^a$ as provided with spokes 1$^b$ while the auxiliary wheel 6$^a$ is also provided with spokes 6$^b$. The auxiliary wheel 6$^a$ has an integral extension 6$^x$ by means of which the pitman and connecting rod are secured. The body portion 1$^a$ is provided with the usual lug 7$^a$ arranged to enter a recess in the auxiliary wheel, as shown.

In Fig. 5 I have shown a construction which is primarily designed for internal combustion engines. In this view the body portion 1$^c$ of the wheel is recessed to receive an auxiliary wheel 6$^c$. The latter has a recess arranged to receive an integral lug 7$^c$ on the body portion 1$^c$. Both of the wheels 1$^c$ and 6$^c$ are loosely mounted on the shaft 15. The latter has a drive member 16 such as a gear or pulley which enters a recess in the wheel 6$^c$. The drive member 16 is keyed to the shaft 15 and is provided with a pin 17 which connects it with the auxiliary wheel 6$^c$.

In this form of the device it will be observed that the drive shaft 15 when rotating will carry around with the drive member 16 and also the auxiliary wheel 6$^c$. The power which is applied to the body portion 1$^c$ however is transmitted through the lug 7$^c$ on the opposite side of the shaft in the same manner as described in connection with the engine drive wheels.

The arrangement set forth above eliminates a great deal of the unsteadiness which is now occasioned by the ordinary driver having a counter-balancing weight on the opposite side from the connecting pin. In the older constructions, dead centering was frequent so that in order to start forward, it was sometimes necessary to reverse to bring the wheels off dead center and then to proceed forwardly. In the present construction this is not necessary since the force is so equalized that with a companion wheel connected with the pitmen at 90° there is never any dead center. The equalization of the force of the wheel results in a gain in power which is considerable.

In Fig. 7, I have shown a modified form in which the auxiliary wheel 6$^y$ has a counter-balancing portion 21 consisting of a flange which overlaps the body portion 1$^y$ in the manner shown in the drawing. This flange, it will be noted from Fig. 8, is beveled outwardly. The flange forms a counter-balance for the pitman and driving pin, and furthermore it forms a cover for preventing the entrance of dirt or grit between the auxiliary wheel 6$^y$ and the main wheel 1$^y$. The operation of this form of the device is substantially the same as that of the other forms heretofore disclosed.

When the connecting pin and the axle are in the horizontal line where the wheel would be ordinarily dead center, a movement of the pin upwardly gradually increases the thrust of the pitman, and at the same time the weight of the auxiliary wheel acts on the lug of the main wheel, thus throwing the weight and gravity onto the main wheel and equalizing the steam pressure on the connecting pin and throughout the wheel. When the connecting pin passes downwardly below the horizontal, it reverses the action of the opposite side of the wheel and has the same action as described as far as the weight, gravity, and action of the steam pressure is concerned. Furthermore, this action obviates dead pressure since with the lever action, the resistance against the pin is overcome by the equalized pressure, thus rendering the wheel more efficient than the ordinary wheel in which the pitman is connected directly to the main wheel. The leverage obtained by the construction also reduces to a minimum any tendency of dead centering of the device, and there is also the advantage of the lever action.

The construction also prevents the pounding which occasions flattened rails and flattened wheels because of the fact that the steam pressure being equalized, the movement is more uniform than that obtained by the ordinary overthrust counter-balanced wheel.

This construction is adapted to gas engines, automobiles, airships, motor boats, all stationary machinery, locomotive engines, electric cars, and also for ring bearings and any other machinery in which it is necessary to counter-balance or to equalize the driving force.

I claim:—

1. In an engine construction, a drive wheel, an axle therefor, a lever pivoted on said axle and having a slight movement longitudinally of the major axis of the lever and arranged to engage the drive wheel near the periphery thereof, and a connecting rod secured to said lever on the opposite side of the axle.

2. In an engine construction, an axle, a main wheel having a hub arranged to receive the axle, an auxiliary wheel having an opening arranged to receive the hub, and movable radially with respect thereto, a pitman connected to said auxiliary wheel on one side thereof, and means for causing the engagement of the auxiliary wheel with the main body portion, on the opposite side of the hub.

3. In an engine construction, a main wheel having a recess in one side thereof, an auxiliary wheel disposed within the recess, said main wheel having a central hub arranged to enter an opening in the auxiliary wheel, a lug carried by the main wheel near the periphery thereof and arranged to enter a slot in the auxiliary wheel on the opposite side of the hub.

4. In an engine construction, a main wheel having a recess on one face thereof, and being provided with a central hub arranged to receive an axle, an auxiliary wheel having a central elliptical shaped opening arranged to receive the hub and being provided with a slot arranged to receive a portion of the main wheel near the periphery thereof, and a connecting rod secured to said auxiliary wheel on the opposite side of the hub.

5. In an engine construction, a main wheel having a recess on one face thereof, and being provided with a central hub arranged to receive an axle, an auxiliary wheel having a central elliptical shaped opening arranged to receive the hub and being provided with a slot arranged to receive a portion of the main wheel near the periphery thereof, and a connecting rod secured to said auxiliary wheel on the opposite side of the hub, said auxiliary wheel having cut-away portions for counter-balancing said connecting rod.

6. In an engine construction, a main wheel having a recess on one face thereof and being provided with a central hub arranged to receive an axle, an auxiliary wheel having an elliptical shaped opening arranged to receive the hub, said auxiliary wheel being arranged to enter the recess in said main wheel, means for holding the auxiliary wheel to the main wheel, said auxiliary wheel having slight play in the direction of the major axis of the elliptical shaped opening, said main wheel having a lug arranged to enter a slot in the auxiliary wheel on one side of said elliptical shaped opening, and a pitman secured to the auxiliary wheel on the opposite side.

7. In an engine construction, a main wheel having a recess on one face thereof and being provided with a central hub arranged to receive an axle, an auxiliary wheel having an elliptical shaped opening arranged to receive the hub, said auxiliary wheel being arranged to enter the recess in said main wheel, means for holding the auxiliary wheel to the main wheel, said auxiliary wheel having slight play in the direction of the major axis of the elliptical shaped opening, said main wheel having a lug arranged to enter a slot in the auxiliary wheel on one side of said elliptical shaped opening, and a pitman secured to the auxiliary wheel on the opposite side, said auxiliary wheel having cut-away portions to counter-balance the parts of the wheel.

WM. R. GARNER.

Copies of this patent may be obtained for five cents each, by addressing the "Commissioner of Patents, Washington, D. C."